United States Patent
Khan

(10) Patent No.: US 9,697,651 B2
(45) Date of Patent: Jul. 4, 2017

(54) SYSTEMS, METHODS, APPARATUSES, AND COMPUTER PROGRAM PRODUCTS FOR FACILITATING RESERVATION FOR A PARKING SPACE WITH A NEAR FIELD COMMUNICATION-ENABLED DEVICE

(75) Inventor: Mohammad Khan, San Jose, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 181 days.

(21) Appl. No.: 13/171,136

(22) Filed: Jun. 28, 2011

(65) Prior Publication Data

US 2011/0320243 A1  Dec. 29, 2011

Related U.S. Application Data

(60) Provisional application No. 61/359,137, filed on Jun. 28, 2010.

(51) Int. Cl.
*G07B 15/02* (2011.01)
*G06Q 20/32* (2012.01)
*G07F 17/24* (2006.01)

(52) U.S. Cl.
CPC ......... *G07B 15/02* (2013.01); *G06Q 20/3278* (2013.01); *G07F 17/246* (2013.01)

(58) Field of Classification Search
CPC .... G06Q 30/02; G06Q 20/3278; G06Q 20/20; G07B 15/02; G07F 17/246
See application file for complete search history.

(56) References Cited

U.S. PATENT DOCUMENTS

| | | | |
|---|---|---|---|
| 6,435,406 B1 | 8/2002 | Pentel | |
| 6,505,774 B1 * | 1/2003 | Fulcher | G06Q 30/0284 235/379 |
| 8,060,413 B2 | 11/2011 | Castell et al. | |
| 8,184,019 B2 * | 5/2012 | Chauvin et al. | 340/932.2 |

(Continued)

FOREIGN PATENT DOCUMENTS

| | | |
|---|---|---|
| KR | 10-2008-002835 | 1/2008 |
| KR | 10-2009-0000735 | 1/2009 |

(Continued)

OTHER PUBLICATIONS

"PARX, a Subsidiary of OTI, and Neos Tech Introduce 'EasyPark' in Italy." PR Newswire Nov. 11, 2008: NA. ProQuest. PROQUESTMS. Mar. 1, 2017 https://dialog.proquest.com/professional/professional/docview/678523181?accountid=142257.*

(Continued)

*Primary Examiner* — Michael Harrington
(74) *Attorney, Agent, or Firm* — Jenkins, Wilson, Taylor & Hunt, P.A.

(57) ABSTRACT

Methods, systems, apparatuses, and computer readable media for facilitating reservation for a parking space with a near field communications (NFC)-enabled device are provided. A system can include an NFC-enabled parking meter associated with a parking space and a controller in communication with the NFC-enabled parking meter for measuring time and processing payment. A system can include an NFC-enabled device that upon interfacing with the NFC-enabled parking meter communicates with the controller to create a reservation of a parking space.

34 Claims, 4 Drawing Sheets

(56) References Cited

U.S. PATENT DOCUMENTS

| | | | |
|---|---|---|---|
| 2002/0032601 A1* | 3/2002 | Admasu et al. | 705/13 |
| 2002/0095333 A1* | 7/2002 | Jokinen et al. | 705/14 |
| 2002/0143638 A1 | 10/2002 | August et al. | |
| 2003/0050854 A1 | 3/2003 | Showghi et al. | |
| 2004/0054591 A1 | 3/2004 | Spaeth et al. | |
| 2004/0054592 A1 | 3/2004 | Hernblad | |
| 2004/0158499 A1 | 8/2004 | Dev et al. | |
| 2005/0222961 A1* | 10/2005 | Staib et al. | 705/64 |
| 2006/0218040 A1 | 9/2006 | Sabapathypillai | |
| 2007/0016479 A1 | 1/2007 | Lauper | |
| 2007/0205278 A1 | 9/2007 | Lovett | |
| 2007/0224979 A1 | 9/2007 | O'Neal et al. | |
| 2008/0114884 A1 | 5/2008 | Hewes et al. | |
| 2008/0126261 A1* | 5/2008 | Lovett | 705/72 |
| 2008/0262929 A1 | 10/2008 | Behr | |
| 2009/0112765 A1* | 4/2009 | Skowronek | 705/44 |
| 2009/0216606 A1 | 8/2009 | Coffman et al. | |
| 2009/0281903 A1 | 11/2009 | Blatstein | |
| 2010/0070365 A1 | 3/2010 | Siotia et al. | |
| 2011/0015934 A1* | 1/2011 | Rowe | G06Q 30/02 705/1.1 |
| 2011/0082746 A1 | 4/2011 | Rice et al. | |
| 2011/0084804 A1 | 4/2011 | Khorashadi et al. | |
| 2011/0258058 A1 | 10/2011 | Carroll et al. | |
| 2011/0264490 A1 | 10/2011 | Durvasula et al. | |
| 2011/0276511 A1* | 11/2011 | Rosenberg | 705/345 |
| 2012/0005026 A1 | 1/2012 | Khan et al. | |
| 2012/0059741 A1 | 3/2012 | Khan et al. | |
| 2012/0072311 A1 | 3/2012 | Khan | |

FOREIGN PATENT DOCUMENTS

| | | |
|---|---|---|
| WO | WO 2006/055721 A2 | 5/2006 |
| WO | WO 2009/158681 A1 | 12/2009 |
| WO | WO 2011/150369 A2 | 12/2011 |
| WO | WO 2012/027748 A2 | 3/2012 |

OTHER PUBLICATIONS

"ViVOtech Launches ViVOpay Kiosk II for Rapid Integration of Contactless & NFC Technology with Customer-Facing Self-Service Payment Systems." Business Wire Nov. 4, 2008: NA. ProQuest. PROQUESTMS. Mar. 1, 2017 https://dialog.proquest.com/professional/professional/docview/678530030?accountid=142257.*
"Strix Systems and Digital Payment Technologies Partner in Wireless Parking Meter Solution." Business Wire Sep. 4, 2008: NA. ProQuest. PROQUESTMS. Mar. 1, 2017 https://dialog.proquest.com/professional/professional/docview/677781947?accountid=142257.*
Notification of Transmittal of the International Search Report and the Written Opinion of the International Searching Authority, or the Declaration for the International Application No. PCT/US2011/038408 (Feb. 29, 2012).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2 Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
Non-Final Official Action for U.S. Appl. No. 13/118,046 (Oct. 3, 2012).
Notification of Transmittal of the International Search Report and the Written Opinion of the International Searching Authority, or the Declaration for International Application No. PCT/US2011/049572 (May 1, 2012).
Applicant-Initiated Interview Summary for U.S. Appl. No. 13/118,046 (Jan. 23, 2015).
Non-Final Office Action for U.S. Appl. No. 13/220,360 (Dec. 18, 2014).
Communication pursuant to Article 94(3) EPC for European Patent Application No. 11787521.1 (Oct. 27, 2014).
Non-Final Office Action for U.S. Appl. No. 13/118,046 (Sep. 25, 2014).
Interview Summary for U.S. Appl. No. 13/220,360 (Jul. 29, 2014).
Advisory Action for U.S. Appl. No. 13/236,243 (Jul. 17, 2014).
Non-Final Office Action for U.S. Appl. No. 13/220,360 (Jun. 27, 2014).
Final Office Action for U.S. Appl. No. 13/236,243 (Apr. 21, 2014).
Non-Final Office Action for U.S. Appl. No. 13/118,046 (Apr. 16, 2014).
Final Office Action for U.S. Appl. No. 13/220,360 (Mar. 3, 2014).
Extended European Search Report for European Application No. 11787521.1 (Feb. 28, 2014).
Extended European Search Report for European Application No. 11820781.0 (Feb. 27, 2014).
Non-Final Office Action for U.S. Appl. No. 13/236,243 (Jun. 18, 2015).
Final Office Action for U.S. Appl. No. 13/220,360 (Jun. 4, 2015).
Applicant-Initiated Interview Summary for U.S. Appl. No. 13/220,360 (Mar. 26, 2015).
Final Office Action for U.S. Appl. No. 13/118,046 (Feb. 27, 2015).
Non-Final Office Action for U.S. Appl. No. 13/236,243 (Oct. 4, 2013).
Non-Final Office Action for U.S. Appl. No. 13/220,360 (Oct. 2, 2013).
Final Office Action for U.S. Appl. No. 13/118,046 (Oct. 2, 2013).
Communication of European Publication Number and Information on the Application of Article 67(3) EPC for European Patent Application No. 11820781.0 (Jun. 5, 2013).
Communication of European Publication Number and Information on the Application of Article 67(3) EPC for European Patent Application No. 11787521.1 (Mar. 13, 2013).

* cited by examiner

SYSTEMS, METHODS, APPARATUSES, AND COMPUTER PROGRAM PRODUCTS FOR FACILITATING RESERVATION FOR A PARKING SPACE WITH A NEAR FIELD COMMUNICATION-ENABLED DEVICE

RELATED APPLICATIONS

This application claims the benefit of U.S. Provisional Patent Application Ser. No. 61/359,137, filed Jun. 28, 2010; the disclosure of which is incorporated herein by reference in its entirety.

TECHNICAL FIELD

The subject matter described herein relates to effecting transactions using wireless near field communications ("NFC") devices. More particularly, the subject matter described herein relates to systems, methods, apparatuses, and computer program products for using NFC-enabled devices that allow consumers the ability to reserve and/or pay for parking spaces managed by NFC-enabled parking meters.

BACKGROUND

Today, paid parking spaces at public places are managed using parking meters that are expensive and hard to maintain. Current parking meters that are purely mechanical cannot easily track usage and collection information. Electronic parking meters can require a large amount of power, which can be provided by battery power or an electrical connection that is connected to an electric power source. These meters charge users based on pre-defined time slots. This model of reserving space at parking sites and physically making payments at the parking meter is inefficient and has multiple limitations. The current model is very inconvenient for consumers. The consumer has to make a payment for a timeslot that is a best effort estimate. The consumer ends up using either more or less of selected time-slot, the consumer ends up returning back to pay to reserve more time or be penalized with a fine.

Lost revenue is also a problem for any parking authority managing parking spaces. It can be very expensive for organizations to manage all expired parking meters. Although an automated process would eliminate the fines consumers pay for expired meters, it is expected that the organization would realize higher revenue from efficient management of the metered slots.

Accordingly, there exists a need for cost effective systems, methods, apparatuses, and computer program products for maximizing efficiencies relating to parking meter spaces for both consumers and parking authorities that manage parking spaces.

SUMMARY

Methods, systems, apparatuses and computer readable media for facilitating reservation of a parking space with a near field communications (NFC)-enabled device are disclosed. According to one aspect, the subject matter described herein includes a system for facilitating reservation for a parking space with an NFC-enabled device. The system can include an NFC-enabled parking meter associated with a parking space and a controller for measuring time and processing payment. The system can also include an NFC-enabled device that upon interfacing with the NFC-enabled parking meter communicates with the controller to create a reservation of a parking space.

According to another aspect, the subject matter described herein includes a method for facilitating reservation for a parking space with an NFC-enabled device. The method includes interfacing an NFC-enabled device with an NFC-enabled parking meter associated with one or more parking spaces to receive data from the NFC-enabled parking meter regarding a parking space. The method also includes reserving the parking space associated with the NFC-enabled parking meter through the NFC-enabled device. The method further includes receiving an electronic confirmation for the reservation of the parking space at the NFC-enabled device.

According to further aspect, the subject matter described herein includes a parking meter apparatus for facilitating reservation for a parking space with an NFC-enabled device. The parking meter can include a parking meter housing positionable proximate to a parking space. The parking meter can also include a wireless transceiver disposed in the parking meter housing. The wireless transceiver can be configured to receive and transmit a signal from and to an NFC-enabled device regarding a parking space to permit reservation of the parking space associated with the NFC-enabled parking meter through the NFC-enabled device.

The subject matter described herein may be implemented in software, in combination with hardware and/or firmware. For example, the subject matter described herein may be implemented in software executed by a hardware-enabled processor. In one exemplary implementation, the subject matter described herein for facilitating reservation of a parking space through an NFC-enabled device may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION OF THE INVENTION

Figure 1:
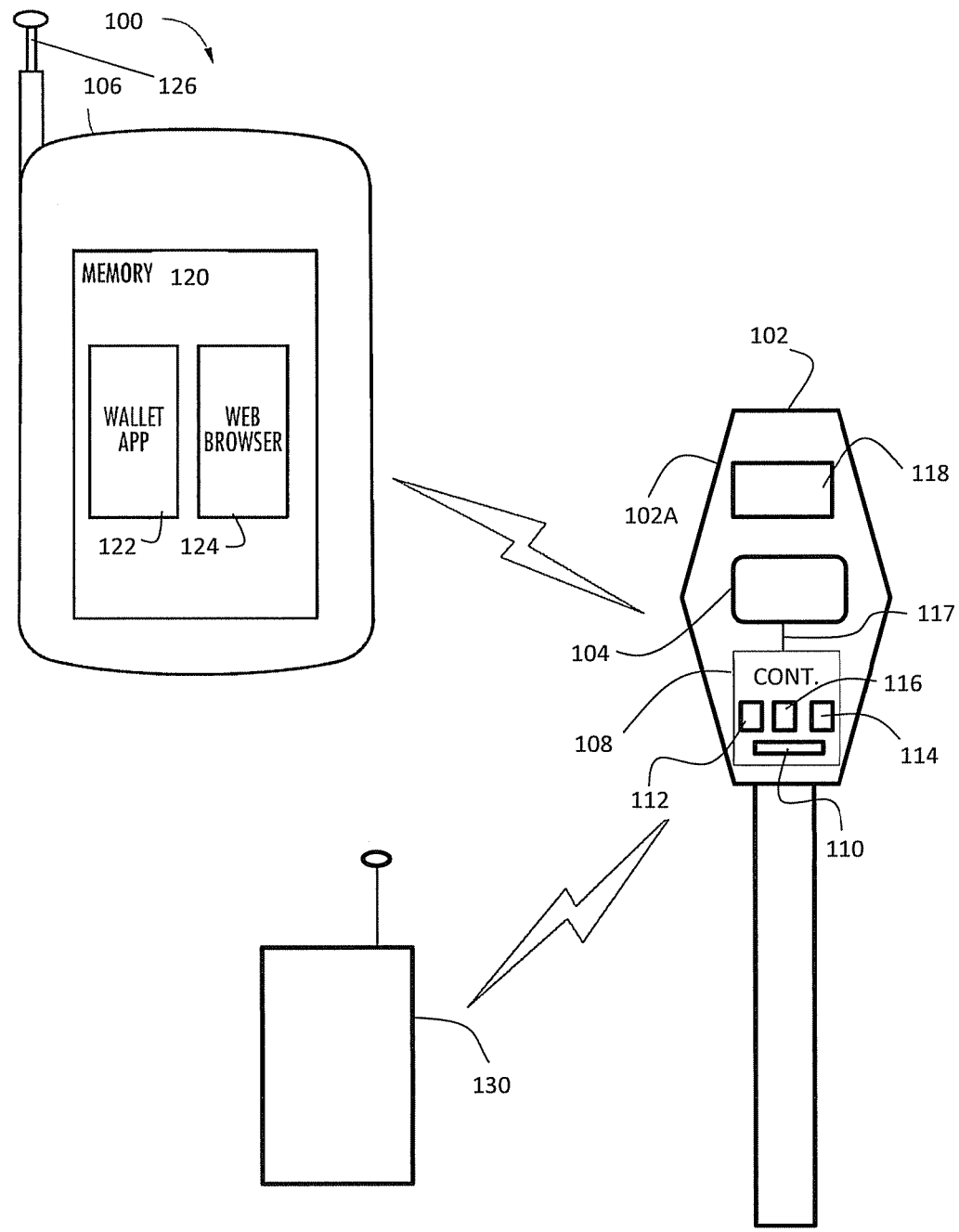
FIG. 1 is a schematic diagram illustrating an embodiment of a system for facilitating reservation for a parking space with a near field communications (NFC)-enabled device according to the subject matter described herein.

Reference will now be made in detail to the description of the presently disclosed subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

As used herein, the term "wireless communications" may include communications conducted at ISO 14443 and ISO 18092 interfaces. These specifications define communication protocols for wireless smart devices operating in close proximity with a reader antenna.

As used herein, the term "wireless transceiver" refers generally to a device that can receive a signal from and send a signal to other devices which may include, but are not limited to, mobile phones, mobile tablet devices, other NFC-enabled devices, and/or servers. Examples of wireless transceivers may include, but are not limited to, NFC passive tags, wireless device readers, or the like.

As used herein, the terms "passive tag" and "NFC passive tag" refers generally to a passive NFC or RF tag device that is powered by an interfacing an NFC-enabled device. For example, after an NFC-enabled device is brought in close proximity to create an interface with an NFC passive tag, the NFC passive tag may be activated by obtaining power from the electromagnetic field generated by the NFC-enabled device. For example, an NFC passive tag can be capable of communicating a variety of information that may include, but is not limited to, a location identifier, such as a uniform resource locator (URL), internet protocol (IP) address, or a uniform resource identifier (URI), tag identification number, other identification numbers, or the like As used herein, the term "wireless device reader" refers generally to an active reading device that can receive information from and transmit information to other devices. For example, wireless device readers can include, but are not limited to, contactless readers that can obtain information from other devices through a communication system such as NFC-enabled devices that use near field communications. Such wireless device readers may be powered by a power source that may include but is not limited to a battery or an electrical connection connected to an electric power source.

As used herein, the term "NFC-enabled device" refers to a device with processing capabilities that can conduct near field communications with a wireless transceiver, such as a wireless device reader or NFC passive tag. An NFC-enabled device may have on-board memory or other storage capacity, may be written to as well as read from and may contain one or more applications that perform a particular function. Some NFC-enabled devices may contain an operating system and/or user interface. An NFC-enabled device may include, but is not limited to, contactless cards, contactless fobs, and mobile phones and PDAs provisioned with soft cards. In one non-limiting example of near field communications, an NFC-enabled device may communicate with a wireless transceiver via inductive coupling of the transceiver antenna to the device antenna. Two loop antennas, one on the device and one on the transceiver, can effectively form a transformer to generate an electromagnetic field. The wireless device transceiver can use amplitude modulation (AM) to manipulate the radio frequency (RF), or electromagnetic, field in order to send information to the device. The device, in turn, can communicate with the transceiver by modulating the loading on the device antenna, which consequently modulates the load on the device transceiver antenna.

The terms "tap," "NFC tap," and "interface" can be used to mean the same actions. As used herein, the terms "tap" and "NFC tap," in reference to NFC-enable devices and wireless transceivers such as device readers or NFC passive tags, means to provide a close or near field interface between an NFC-enabled device and a wireless transceiver.

As used herein, the term "backend server" refers generally to a device or network that is capable of storing and/or processing information that can be received via communications such as wired or wireless communications. For example, backend servers can include, but are not limited to, computers, servers, wide area networks, local area networks, cloud computing networks, or the like.

The present subject matter describes various methods, systems, and computer readable media that may be utilized to facilitate the use of a wireless NFC-enabled device to reserve and/or pay for a parking space managed by an NFC-enabled parking meter or parking meter apparatus. As used herein, the phrases "parking meter" and "parking meter apparatus" are used interchangeably. The present subject matter may provide a consumer the opportunity to reserve and/or pay for a parking space via a single near field communications tap (NFC tap, or tap) on the NFC-enabled parking meter with an NFC-enabled device to reserve the available parking space and initiate the start time for the reservation. When the consumer is finished using the parking space, the consumer may provide another single NFC tap on the NFC-enabled parking meter to release the parking space and make the payment for the allotted time of use of the parking space. In some embodiments, the consumer can pay set amounts for specific amounts of time for use of the parking space. In some embodiments, the consumer can reserve a parking space with the NFC-enabled parking meter tracking the amount owed using a timer and providing a bill upon the release of the parking space. In such a case, the payment can be charged to a payment card (prepaid card or credit card, for example) based on a card number provided during one of the NFC taps, for example, from a wallet application on the NFC-enabled device. Alternatively, payment can be charged to a payment account as described below. The NFC-enabled parking meter can be a dummy unit that communicates with a backend server that may track time of use and calculate an amount owed. Alternatively, the NFC-enabled parking meter can comprise a controller that can track time of use, calculate amount owed and calculated and track revenue collected that can then be downloaded to a backend server at a later time. Communication with the backend server can be accomplished using any wireless means of communication, such as 4G, 3G, GSM, GPRS, WiFi, WiMax, and other remote local or remote wireless communication using information obtained via the single NFC tap.

The subject matter described herein includes systems, methods, and computer program products for using smart devices, such as NFC-enabled phones, that allows consumers the ability to reserve and pay for parking space managed by smart device-enabled parking meters. For an available parking space, a consumer may provide an NFC tap with the parking meter to reserve the space and initiate the start-time for the reservation. When done using the parking space, a consumer can provide another NFC tap with the parking meter to release the parking space and make the payment for the parking space used. FIG. 1 is a schematic diagram illustrating an exemplary parking system 100 for reserving parking spaces at parking sites and/or making payment for use of the parking space for a consumer. System 100 may also provide monitoring capabilities to the authority monitoring the parking site according to the subject matter herein. In one embodiment, as shown in FIG. 1, system 100 may include a parking meter, or parking meter apparatus, 102 that comprises a parking meter housing 102A and a wireless transceiver, such as a wireless device reader 104. Wireless device reader 104 can wirelessly communicate with a wireless NFC-enabled device 106. Parking meter 102 may be connected to a power source (not shown) to provide power to the wireless device reader 104, for example. The power source can be, for example, a battery or an electrical connection connected to an electric power source.

Wireless device reader 104 of parking meter 102 may include any contactless card or device reader (e.g., a wireless RFID reader) that is capable of reading wireless NFC-enabled devices, wireless smart devices, such as mobile phones, smart cards or any other contactless payment type cards. In one embodiment, parking meter 102 may include a controller 108 that can include a processing unit 110, a transceiver unit 112, a database 114 and a timer 116 can be in communication with device reader 104 through a wired connection 117 or a wireless connection (not shown). Timer 116 can be implemented in hardware or software. Processing unit 110 of controller 108 may include any processor, microcontroller, or central processing unit (CPU) that is capable of executing computer programs (e.g., software, firmware, etc.) that control the device reading functions. In one embodiment, processing unit 110 may include an embedded ARM based hardware processor (e.g., an ARM7 processor) that is configured to execute firmware programs (e.g., written in C language) for operating device reader 104 of parking meter 102. Parking meter 102 can also include a display 118 for displaying a status, of the parking meter to a parking authority and to the general public. For example, the status of parking meter 104 may include whether the parking space is reserved or released, i.e., being available for parking, and the amount of time a reservation has left or has been running.

Transceiver unit 112 may include any device, such as a radio controller chip, that is capable of transmitting radio frequency (RF) signals to (and receiving RF signals from) wireless NFC-enabled device 106. In one embodiment, transceiver unit 112 is the component in device reader 104 that is responsible for controlling and monitoring an antenna and a field strength sensor (not shown). An antenna may include a transducing element that transmits an electromagnetic field. The antenna may use the electromagnetic field to establish a connection to a built-in antenna 126 on wireless NFC-enabled device 106. Transceiver unit 112 may also include a device that creates a strong enough signal to communicate with a remote device, such as a backend server or a mobile phone.

Database 114 may include any memory structure for holding data, such as memory, and the like. In one embodiment, database 114 may be a table that contains transmission parameters for adjusting the RF gain stage of device reader 104. These radio parameters may include values that are set in transceiver unit 112 that affects the modulation index of device reader 104. These parameters may be predefined binary numbers that are placed in the table. Database 114 may include tables or arrays to track parking transactions or the like.

Wireless NFC-enabled device 106 can include mobile phones, mobile tablet devices, and other handheld devices. A hardware processor can be included in wireless NFC-enabled device 106 to enable the near field communications. For example, mobile phones and mobile tablet devices can include such a hardware processor. In some embodiments, wireless NFC-enabled device 106 can be available in other forms, such as plastic cards, key fobs, or the like. A chip in a contactless card may contain the same information held by the conventional electromagnetic stripe of a credit card or debit card. In some embodiments, wireless NFC-enabled device 106 may include a radio frequency identification (RFID) card, a credit card with an embedded wireless chip, and any other like card capable of supporting wireless or contactless payment transactions. In the embodiment shown in FIGS. 1, 2A and 2B, a wireless NFC-enabled device (e.g., a mobile phone or tablet device) 106 can include a memory 120 on which a wallet application 122 and a web browser 124 may reside. Wallet application 122 may be stored in a secure memory element of NFC-enabled device 106 or in a non-secure baseband memory without departing from the scope of the present subject matter. In such an embodiment, a prepay card from the wallet application 122 that is associated with the user of NFC-enabled device 106 can be used make the payment for use of the parking space either at the beginning or the end of the reservation.

Wireless NFC-enabled devices 106 can provide for the protection of personal information as well as delivering fast, secure transactions (e.g., transit fare payment cards, parking space payments, etc.) via RF technology. Wireless NFC-enabled devices 106 have the ability to securely manage, store and provide access to data on the card, perform on-card functions (e.g., encryption) and interact intelligently with wireless device reader 104.

NFC-enabled device 106 can also include an antenna 126 that is disposed on the exterior (as shown in FIG. 1) or the interior of NFC-enabled device 106. Antenna 126 can facilitate wireless communication between NFC-enabled device 106 and wireless device reader 104.

System 100 for facilitating reservation for a parking space with an NFC-enabled device 106 can thus include an NFC-enabled parking meter 102 associated with one or more parking spaces. A controller 108 can be in communication with NFC-enabled parking meter 102. Controller 108 can be used for measuring time and processing payment. For example, controller 108 may calculate the payments owed based of time of use, accept payments, and track and store the payments that are collected. NFC-enabled device 106, upon interfacing with NFC-enabled parking meter 102 can be provided with a reservation for a parking space. As stated above, controller 108 can comprise a timer 116. Upon interfacing with NFC-enabled parking meter 102 via a single NFC tap, timer 116 can be started for the reservation. Parking meter 102 can provide an electronic confirmation directly to NFC-enabled device 106 of the reservation for the parking space.

In some embodiments, NFC-enabled device 106 can provide a prepayment for an allotment of time for the parking space. In such embodiments, controller 108 can provide an alert to NFC-enabled device 106 to display a message on NFC-enabled device 106 to provide notification of a pending lapse of the allotment of time for the parking space. For example, the alert can be provided to NFC-enabled device 106 via a multimedia messaging service (MMS) message or a short messaging service (SMS) message. In such cases, NFC-enabled device 106 may provide an interface to allow the user to make an additional prepayment for an extended allotment of time for the parking space.

In some embodiments, upon interfacing NFC-enabled device 106 with NFC-enabled parking meter 102 via a second NFC tap, timer 116 can be stopped and NFC-enabled device 106 can provide payment for use of the parking space. NFC-enabled parking meter 102 can release the parking space upon interfacing NFC-enabled device 106 with NFC-enabled parking meter 102 via the second NFC tap. As stated above, NFC-enabled parking meter 102 can include a display 118 which can show, for example, whether timer 116 is running. Similarly, display 118 on NFC-enabled parking meter 102 can be used for displaying whether the parking space is under a reservation or has been released.

Such parking meter systems 100 can provide additional revenue streams for the owner of such systems. For example, upon interfacing NFC-enabled devices 106 with NFC-enabled parking meter 102, controller 108 can provide location specific marketing to NFC-enabled device 106 for display on NFC-enabled device 106. For example, advertising for local establishments in the vicinity of the reserved parking space can be provided to NFC-enabled device 106 via a multimedia messaging service (MMS) message or a short messaging service (SMS) message. Alternatively, one or more links to websites associated with local establishments in the vicinity of the reserved parking space can be provided to NFC-enabled device 106 via controller 108 that can be accessed through web browser 124 on NFC-enabled device 106.

In the embodiment shown in FIG. 1, information collected and stored on database 114 of controller 108, such as payment information, can be periodically uploaded to an information collection device 130 for recordation, collection, and/or storage. For example, information collection device 130 can be a backend server that is in wireless communication with controller 108. In some embodiments, such a backend server can be used to monitor and track usage of multiple parking spaces in multiple locations to provide an overall parking management system. Alternatively, information collection device 130 can be a handheld recordation device. For example, parking authority personnel can use an information collection device 130 in the form of a mobile device, such as a mobile tablet device or phone (handset), to check the status of parking spaces. The parking authority personnel can be physically present at the parking meter or remotely located. If the parking meter also has a sensor associated therewith (not shown) to detect a vehicle parked in the parking space, parking authority personnel can determine the status of parking space remotely. In such an embodiment, the parking authority personnel may need only visit the parking space when there is an issue to write a parking citation, and post such a citation on the vehicle in question. Further, the information collected by the parking authority with a handheld information collection device 130 can be sent wirelessly to a backend server that can be used to monitor and track usage of multiple parking spaces in multiple locations to provide an overall parking management system.

Figure 2A:
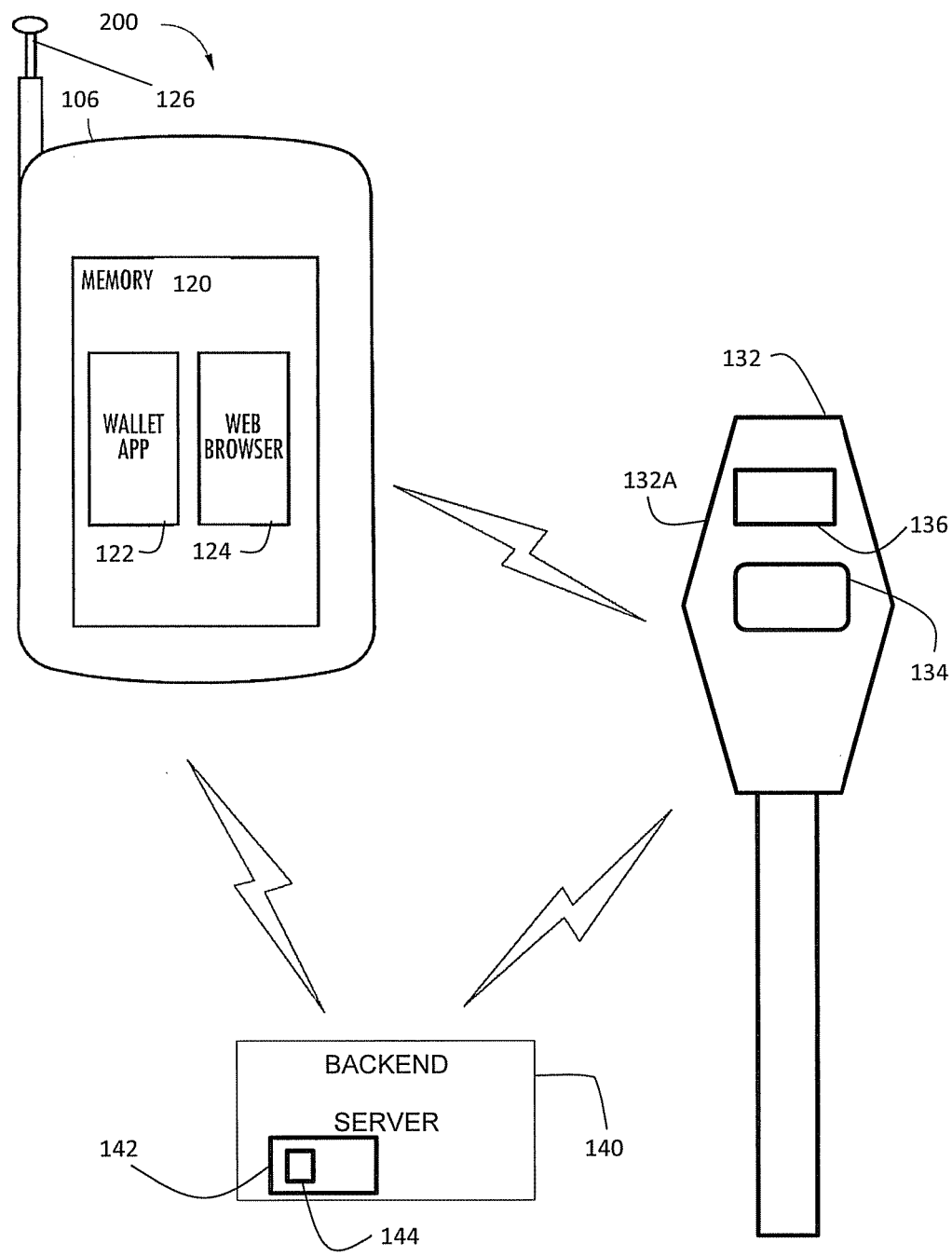
FIG. 2A is a schematic diagram illustrating another embodiment of a system for facilitating reservation for a parking space with an NFC-enabled device according to the subject matter described herein.

FIG. 2A illustrates another embodiment of a system 200 for facilitating reservation for a parking space with an NFC-enabled device 106 similar in some ways to the embodiment of system 100 illustrated in FIG. 1. System 200 may include a parking meter, or parking meter apparatus, 132 that comprises a parking meter housing 132A and a wireless transceiver, such as a wireless device reader 134. Wireless device reader 134 can wirelessly communicate with a wireless NFC-enabled device 106. System 200 may also include a backend server 140. Instead of having the controller located at the parking meter 132 as in system 100 shown in FIG. 1, a controller 142 is located at backend server 140 as shown in FIG. 2A. Parking meter 132 can thus serve as information collection station with the information collected at wireless device reader 134 and then being passed through wireless communication to backend server 140 for processing.

As above, wireless NFC-enabled device (e.g., a mobile phone or tablet device) 106 in FIG. 2A can include a memory 120 on which a wallet application 122 and a web browser 124 may reside. NFC-enabled device 106 can also include an antenna 126, that is disposed on the exterior (as shown in FIG. 2A) or the interior of NFC-enabled device 106. Antenna 126 can facilitate wireless communication between NFC-enabled device 106 and wireless device reader 134.

As above, system 200 for facilitating reservation for a parking space with an NFC-enabled device 106 can thus include an NFC-enabled parking meter 132 associated with one or more parking spaces. A controller 142 can be in communication with NFC-enabled parking meter 132. Controller 142 can be used for measuring time and processing payment. For example, controller 142 can calculate the payments owed based of time of use of the parking space, accept payments, and track and store the payments that are collected. NFC-enabled device 106, upon interfacing with NFC-enabled parking meter 132, can be provided with a reservation of a parking space. Controller 142 can comprise a timer 144 and, upon interfacing with NFC-enabled parking meter 132 via a single NFC tap, timer 144 can be started for the reservation. With the interface between wireless NFC-enabled device 106 and device reader 134, NFC-enabled device 106 can provide an identification number that is sent to backend server 140 to track the identity of a user who is associated with or owns NFC-enabled device 106. Further, where NFC-enabled device 106 is a mobile device, the identification number can be a phone number associated with NFC-enabled device 106. In such embodiments, backend server 140 can communicate directly with NFC-enabled device 106. For example, backend server 140 can provide an electronic confirmation directly to NFC-enabled device 106 of the reservation for the parking space.

In some embodiments, NFC-enabled device 106 can provide a prepayment for an allotment of time for the parking space, for example, through wallet application 122 to backend server 140. In such embodiments, controller 142 of backend server 140 or backend server 140 can provide an alert to NFC-enabled device 106 to display a message on NFC-enabled device 106 to provide notification of a pending lapse of the allotment of time for the parking space. As above, for example, the alert can be provided to NFC-enabled device 106 via a multimedia messaging service (MMS) message or a short messaging service (SMS) message. In such cases, NFC-enabled device 106 may provide an interface to allow the user to make an additional prepayment for an extended allotment of time for the parking space.

In some embodiments, upon interfacing NFC-enabled device 106 with NFC-enabled parking meter 132 via a second NFC tap, a signal can be sent from parking meter 132 to controller 142 which is part of backend server 140 that stops timer 144. NFC-enabled device 106 can provide payment for use of the parking space. The payment information can be sent through wireless communication between backend server 140 and NFC-enabled device 106. An electronic confirmation of the payment for use of the parking space can be sent to NFC-enabled device 106 from backend server 140. NFC-enabled parking meter 132 can release the parking space upon interfacing NFC-enabled device 106 with NFC-enabled parking meter 132 via the second NFC tap. As stated above, NFC-enabled parking meter 132 can include a display 136 which can show, for example, whether timer 142 is running. Similarly, display 136 on NFC-enabled parking meter 132 can be used for displaying whether the parking space is under a reservation or has been released.

Timer 144 can also be stopped and payment for use of the parking space can be made via communication between NFC-enabled device 106 and backend server 140. This can be done remotely relative to parking meter 132 or it can be accomplished through an interface with the parking meter 132. Thus, if a user forgot to stop the timer after leaving the parking space, the user can "check out" using the user's NFC-enabled device 106 at a remote location relative to the parking space, for example, his house, via communication between NFC-enabled device 106 and backend server 140. Similarly, the parking space can be released via communication between NFC-enabled device 106 and backend server 140. As stated above, an electronic confirmation of the payment for use of the parking space can be received at NFC-enabled device 106 from backend server 140.

Figure 2B:
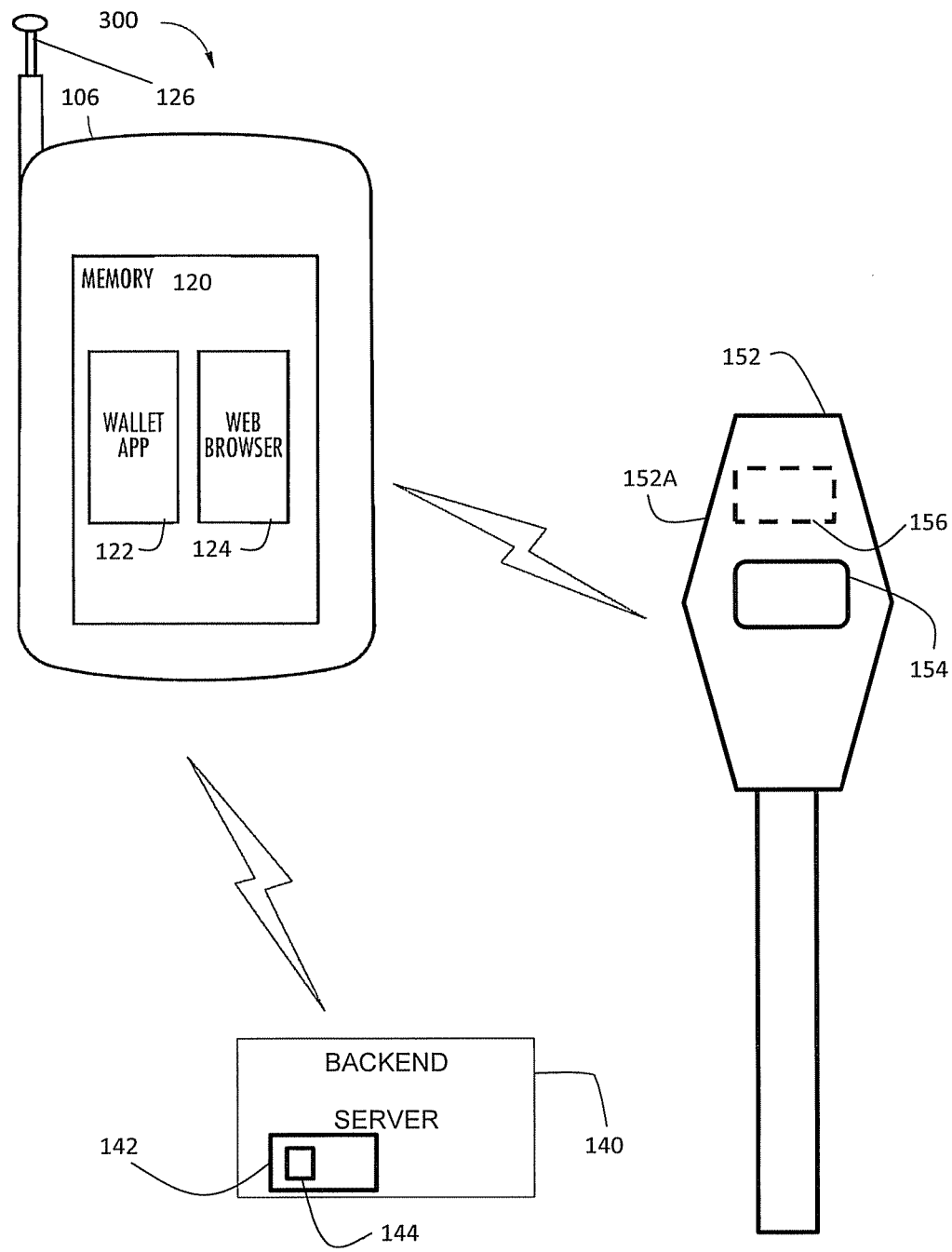
FIG. 2B is a schematic diagram illustrating a further embodiment of a system for facilitating reservation for a parking space with an NFC-enabled device according to the subject matter described herein.

FIG. 2B illustrates another embodiment of a system 300 for facilitating reservation for a parking space with an NFC-enabled device 106 similar in some ways to the embodiment of system 200 illustrated in FIG. 2A. As above, system 300 may include wireless NFC-enabled device (e.g., a mobile phone or tablet device) 106 as in FIG. 2A that may include a memory 120 on which a wallet application 122 and a web browser 124 may reside. NFC-enabled device 106 can also include an antenna 126, that is disposed on the exterior (as shown in FIG. 2B) or the interior of NFC-enabled device 106. Antenna 126 can facilitate wireless communication between NFC-enabled device 106 and other components of system 300. System 300 may include a parking meter, or parking meter apparatus, 152 that comprises a parking meter housing 152A and a wireless transceiver, such as an NFC passive tag 154. System 300 may also include a backend server 140. A controller 142 may be located at a backend server 140 as shown in FIG. 2B.

NFC passive tag 154 can receive a power signal from and wirelessly communicate with a wireless NFC-enabled device 106 when NFC-enabled device 106 is in close-enough range of NFC passive tag 154. For example, when NFC-enabled device 106 interfaces with passive tag 154, for example, by an NFC tap, the transmission waves from NFC-enabled device 106 can provide power to NFC passive tag 154 so that NFC passive tag 154 can transmit parking reservation information, such as a parking meter identifier, like a meter ID number, and a location identifier (e.g., a URI, URL or IP address) associated with backend server 140. The parking reservation information received by NFC-enabled device 106 may automatically initiate a communication link between NFC-enabled device 106 and backend server 140. For example, the parking reservation information received by NFC-enabled device 106 from NFC passive tag 154 may automatically initiate a module B (not shown) on NFC-enabled device 106, which may be a software program stored on NFC-enabled device 106 that may be run by a hardware processor in NFC-enabled device 106. The module B may establish a communication link between NFC-enabled device 106 and backend server 140. In some embodiments, the module B may be wallet application 122. In some embodiments, NFC passive tag 154 can provide the parking reservation information to a module A (not shown) on NFC-enabled device 106, which may be a software program stored on NFC-enabled device 106 that may be run by a hardware processor in NFC-enabled device 106 that permits near field communications between NFC-enabled device 106 and other NFC-enabled devices, such as NFC passive tag 154. In some embodiments, the module A may be a hardware-based circuit. The module A can then communicate the parking reservation information to module B, so that module B may establish a communication link between NFC-enabled device 106 and backend server 140 to reserve the parking space. Backend server 140 can also provide an electronic confirmation directly to NFC-enabled device 106 of the reservation for the parking space.

In the embodiment shown in FIG. 2B, NFC-enabled device 106 may then contact backend server 140 so that controller 142 starts timer 144. Further, NFC-enabled device 106 may provide payment information, such as a prepaid card number or payment card number from wallet application 122 on NFC-enabled device 106 to backend server 140. The parking space associated with parking meter 152 is then reserved and can be used without violation. When the user is ending the use of the parking space, NFC-enabled device 106 may interface with passive tag 154, for example, by a second NFC tap so that NFC passive tag 154 can again transmit the parking reservation information, such as the parking meter identifier and a location identifier (e.g., a URI, URL or IP address) associated with backend server 140. At this point, NFC-enabled device 106 may again contact backend server 140 in a similar manner as described above, so that controller 142 stops timer 144. Backend server 140 may then charge a calculated amount owed based on the time of use measured by the timer to the account associated with the payment information provided earlier from NFC-enabled device 106. An electronic confirmation of the payment for use of the parking space can be sent to NFC-enabled device 106 from backend server 140. Controller 142 of backend server 140 can release the parking space upon interfacing NFC-enabled device 106 with NFC-enabled parking meter 152 via the second NFC tap. As stated above, NFC-enabled parking meter 152 can optionally include a display 156 which can show, for example, whether timer 142 is running. Similarly, display 156 on NFC-enabled parking meter 152 can be used for displaying whether the parking space is under a reservation or has been released. In such an embodiment, power may be provided to parking meter 152. In some embodiments, parking meter 152 may require no power source.

In some embodiments that employ NFC passive tag 154 as shown in FIG. 2B, NFC-enabled device 106 can provide a prepayment for an allotment of time for the parking space, for example, through wallet application 122 to backend server 140. In such embodiments, controller 142 of backend server 140 or backend server 140 can provide an alert to NFC-enabled device 106 to display a message on NFC-enabled device 106 to provide notification of a pending lapse of the allotment of time for the parking space. As above, for example, the alert can be provided to NFC-enabled device 106 via a multimedia messaging service (MMS) message or a short messaging service (SMS) message. In such cases, NFC-enabled device 106 may provide an interface to allow the user to make an additional prepayment for an extended allotment of time for the parking space.

In some embodiments, a payment account can be created by the user that is associated with the identification number associated with NFC-enabled device 106. The payment account may be stored on backend server 140. As above, backend server 140 may be used to monitor and collect information on multiple parking spaces over multiple locations. After the use of a parking space, the payment account associated with the identification number of NFC-enabled device 106 may be charged for the calculated amount owed for such usage. The payment account can be a prepaid account or can be an account that is billed periodically based on time usage of parking spaces monitored by backend server 140 over a specified period. For example, a monthly bill for the payment account can be sent to the user. While described with reference to the embodiment shown in FIG. 2B, it is understood that such a payment account can be used in other embodiments, such as those embodiments shown in FIGS. 1 and 2A.

In some embodiments that employ NFC passive tag 154 as shown in FIG. 2B, an electronic confirmation of the payment for use of the parking space may be sent to NFC-enabled device 106 from backend server 140. The parking space associated with NFC-enabled parking meter 152 may be released via the communication between backend server 140 and NFC-enabled device 106 via the second NFC tap.

If the user does not provide a second interface between NFC-enabled device 106 and NFC passive tag 154, then different options can be provided to terminate use of the parking space and make a payment for the use of the parking space. For example, timer 144 may have a maximum use time that it is allowed to run without an interaction with an NFC-enabled device 106. If a maximum use time is used, then the maximum use time may be arbitrarily set by the parking authority or entity that uses the system and can be any time period that the entity using the system wants the maximum use time to be. For example, the maximum use time can be tied to street or parking lot maintenance, such as street cleaning operations. The maximum use time can also be tied to a rate of turnover desired by the entity using the system. For example, in shopping areas or areas where restaurants are located that may have limited parking spaces available, the entity using the system may set a maximum use time of about two hours so that customer traffic in the monitored area may be increased. In another example, a maximum use time of about eight hours can be set, after which timer 144 will be turned off and the account associated with the payment information that was provided in the initial NFC tap charged. In some embodiments, the maximum time may be about three hours, about four hours, or about six hours, for example. Use of such a maximum use time can be used in other embodiments, such as those shown in FIGS. 1 and 2A.

Alternatively, timer 144 can also be stopped and payment for use of the parking space can be made via communication between NFC-enabled device 106 and backend server 140. This can be done remotely relative to parking meter 152. Thus, if a user forgot to interface NFC-enabled device 106 with NFC passive tag 154 after leaving the parking space, the user can "check out" using the user's NFC-enabled device 106 at a remote location relative to the parking space, for example, his house, via communication between NFC-enabled device 106 and backend server 140. Similarly, the parking space can be released via communication between NFC-enabled device 106 and backend server 140. As stated above, an electronic confirmation of the payment for use of the parking space can also be received at NFC-enabled device 106 from backend server 140. Another alternative may include timer 144 being turned off and the account associated with the payment information that was provided in the initial NFC tap being charged upon a new user providing an interface between a different NFC-enabled device and NFC passive tag 154.

Figure 3:
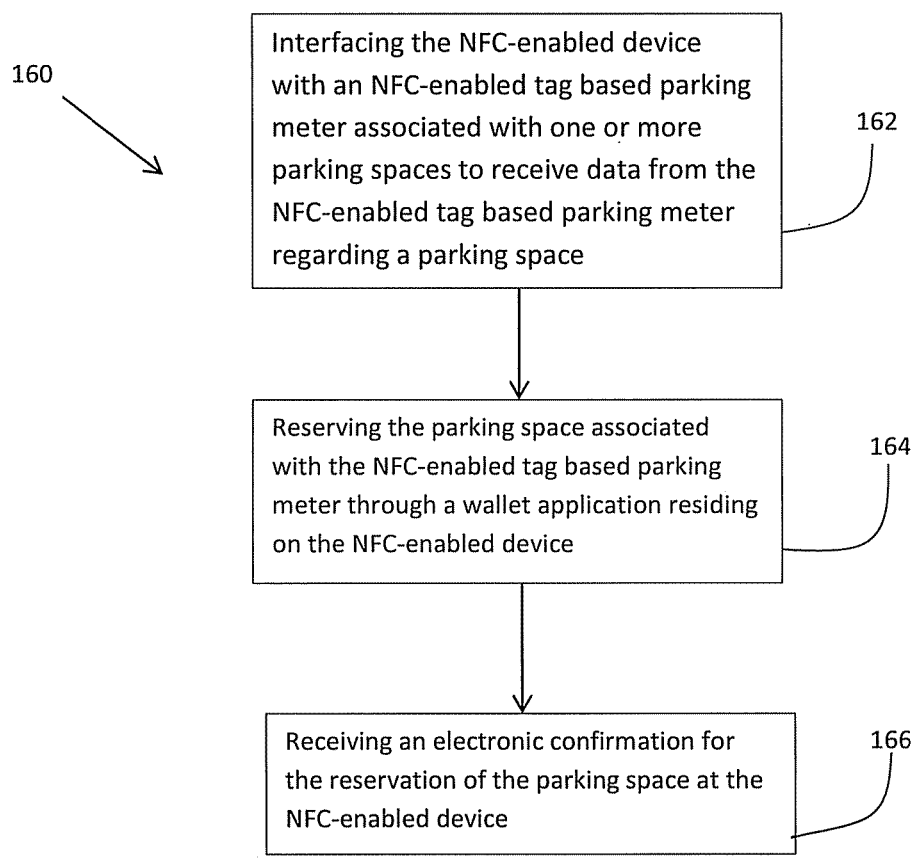
FIG. 3 is a flow chart illustrating an embodiment of a method for facilitating reservation for a parking space with an NFC-enabled device according to the subject matter described herein.

FIG. 3 illustrates a generic method 160 for facilitating reservation for a parking space with NFC-enabled device. Method 160 may include the step 162 in which the NFC-enabled device interfaces with an NFC-enabled parking meter associated with one or more parking spaces to receive data from the NFC-enabled parking meter regarding a parking space. In step 164, the parking space associated with the NFC-enabled parking meter can be reserved through the NFC-enabled device. Further, method 160 can include step 166 in which an electronic confirmation for the reservation of the parking space is received at the NFC-enabled device.

Method 160, as stated above, is a general method that can include other steps and actions. For example, upon reserving the parking space, a timer associated with the NFC-enabled parking meter can be initiated or started. The reservation and timer initiation can be accomplished via a single NFC tap of the NFC-enabled device with a wireless transceiver of the NFC-enabled parking meter. Further, the method can include prepaying for an allotment of time for the parking space via the single tap of the NFC-enabled device. If desired, an alert can be provided to the NFC-enabled device to provide notification of a pending lapse of the allotment of time for the parking space as described above. Additionally, an interface can be provided on NFC-enabled device to pay an additional prepayment for an extended allotment of time for the parking space. Such payments can be made through a wallet application on the NFC-enabled device.

Such a method can additionally, or alternatively, include stopping the timer and paying for use of the parking space upon interfacing with the NFC-enabled parking meter via a second NFC tap of the NFC-enabled device. In such methods, the parking space can be released via the second tap of the NFC-enabled device. At the end of the transaction, an electronic confirmation for the payment for use of the parking space can be provided to the NFC-enabled device. As with prepayment methods, the paying for the parking space can comprise electronically paying with a payment card from a wallet application on the NFC-enabled device. Alternatively, payment can be charged to a payment account associated with the NFC-enabled device that is saved in a backend server as described above. The electronic confirmation for the payment can comprise a short messaging service (SMS) message or a multimedia messaging service (MMS) message.

In some embodiments, a method for facilitating reservation for a parking space with NFC-enabled device can include, at the NFC-enabled parking meter, communicating with a backend server to provide an identification number to track the identity of a user associated with the NFC-enabled device. For example, the NFC-enabled device can be a mobile device and the identification number can be a phone number associated with the mobile device. In such embodiments, the method can include, upon reserving the parking space, initiating a start of a timer at the backend server to track usage time of the parking space.

Similarly, such methods can include prepaying for an allotment of time for the parking space via communication between the backend server and the NFC-enabled device. As above, an alert can be provided from the backend server to the NFC-enabled device to provide notification of a pending lapse of the allotment of time for the parking space. An interface on NFC-enabled device can be provided to pay an additional prepayment for an extended allotment of time for the parking space. After the passing of an allotted amount of time, the premium for each additional allotment of time can increase. As with prepayment methods, the paying for the parking space can comprise electronically paying with a payment card from a wallet application on the NFC-enabled device. Alternatively, payment can be charged to a payment account associated with the NFC-enabled device that is saved in the backend server as described above.

In some embodiments, the method can include stopping the timer and paying for use of the parking space via communication between the NFC-enabled device and the backend server. At such time, the parking space may be released via communication between the NFC-enabled device and the backend server. As stated above, an electronic confirmation for the payment for use of the parking space can also be provided to the NFC-enabled device from the backend server. In such embodiments, the method can include providing location specific marketing to the wallet application on the NFC-enabled device for display on the NFC-enabled device.

The subject matter described herein may be implemented in software, in combination with hardware and/or firmware. For example, the subject matter described herein may be implemented in software executed by a hardware processor. In one exemplary implementation, the subject matter described herein for facilitating reservation of a parking space through an NFC-enabled device may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

Thus, the subject disclosed herein may provide methods, systems and apparatuses for using NFC-enabled devices, such as NFC-enabled phones, that allow consumers the ability to reserve and/or pay for parking space managed by NFC-enabled parking meters according to the subject matter described herein. Such methods, systems, and apparatuses can be low cost to build, operate and maintain as compared to conventional parking meter systems in use. The user can position a mobile NFC-enabled device near or against an NFC-enabled parking "pseudo" meter associated with an available parking space. The mobile NFC-enabled device can be an NFC-enabled phone which can be tapped against an NFC-enabled parking meter. The NFC-enabled phone tap may allow the handset to read the data elements from the NFC-enabled tag which can initiate a communication with the backend remote server connected through a wireless network. The NFC tap can start the timer of the "pseudo" parking meter running that can be located at the remote backend server to track the usage time of the parking space. The mobile device can provide the phone number that can be required by the backend server to track the identity of the person using the parking space. The back-end server can send a confirmation response to the mobile device with such details as the parking space number and the rate charged for using the space.

When the user is ready to release the parking space, the user can tap the NFC-enabled parking meter with his/her NFC-enabled mobile device one more time. At this point, the mobile device can communicate with the backend server managing the parking meters to notify the release of the parking space and complete the payment process. The user can make an electronic payment using one of the payment cards in the user's mobile wallet application, for example. On completion of the transaction, the mobile device can receive a payment completion confirmation from the parking authority.

Parking authority personnel can also use a mobile phone (handset) to check the status of parking spaces by being physically present at the parking space or the status can be checked remotely. If the parking space also has a sensor to detect a vehicle parked, parking authority personnel can determine the status of parking space remotely and can visit the parking space only when there is an issue and/or to write a physical parking ticket to post on the vehicle.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for facilitating reservation for a parking space with a near field communications (NFC)-enabled device, the system comprising:
   an NFC-enabled parking meter associated with a parking space;
   a controller for measuring time and processing payment, wherein the controller is disposed in the NFC-enabled parking meter; and
   an NFC-enabled device that upon interfacing with the NFC-enabled parking meter via NFC communicates with the controller to create a reservation of the parking space and upon a subsequent interfacing with the NFC-enabled parking meter via NFC provides payment for use of the parking space to the NFC-enabled parking meter from a wallet application on the NFC-enabled device, wherein the controller does not communicate payment related data to a backend server that is located external to the NFC-enabled parking meter, and wherein the controller provides location specific marketing associated with local establishments in a vicinity of the parking space for display on the NFC-enabled device upon the interfacing of the NFC-enabled device with the NFC-enabled parking meter to create the reservation of the parking space.

2. The system of claim 1, wherein the controller comprises a timer and, upon interfacing with the NFC-enabled parking meter, the timer is started for the reservation via a single NFC tap.

3. The system of claim 2, wherein the NFC-enabled device provides a prepayment for an allotment of time for the parking space.

4. The system of claim 3, wherein the controller provides an alert to display a message on the NFC-enabled device to provide notification of a pending lapse of the allotment of time for the parking space.

5. The system of claim 4, wherein the NFC-enabled device provides an interface to pay an additional prepayment for an extended allotment of time for the parking space.

6. The system of claim 2, wherein, the timer is stopped and the NFC-enabled device provides payment for use of the parking space upon interfacing the NFC-enabled device with the NFC-enabled parking meter via a second NFC tap.

7. The system of claim 6, wherein the NFC-enabled parking meter releases the parking space upon interfacing the NFC-enabled device with the NFC-enabled parking meter via the second NFC tap.

8. The system of claim 2, wherein the NFC-enabled parking meter comprises a display to show whether the timer is running.

9. The system of claim 1, wherein the NFC-enabled parking meter comprises a display for displaying whether the parking space is under a reservation or has been released.

10. The system of claim 1, wherein the NFC-enabled parking meter comprises a wireless transceiver for interfacing with the NFC-enabled device.

11. The system of claim 1, wherein the NFC-enabled parking meter includes a wireless transceiver that comprises one of a wireless device reader or an NFC passive tag.

12. The system of claim 1 comprising a handheld information collection device configured to check a status of the parking space.

13. A method for facilitating reservation for a parking space with a near field communications (NFC)-enabled device, the method comprising:
   interfacing, via NFC, an NFC-enabled device with an NFC-enabled parking meter associated with one or more parking spaces to receive data from the NFC-enabled parking meter regarding a parking space;
   reserving the parking space associated with the NFC-enabled parking meter through the NFC-enabled device, wherein the NFC-enabled parking meter includes a controller configured to measure time and process payment associated with a reservation of the parking space, wherein the controller is disposed in the NFC-enabled parking meter, wherein the controller does not communicate payment related data to a backend server external to the NFC-enabled parking meter, and wherein the controller provides location specific marketing associated with local establishments in a vicinity of the parking space for display on the NFC-enabled device upon the interfacing of the NFC-enabled device with the NFC-enabled parking meter to create the reservation of the parking space;
   receiving an electronic confirmation for the reservation of the parking space at the NFC-enabled device; and
   interfacing, via NFC, the NFC-enabled device with the NFC-enabled parking meter to provide payment for use of the parking space to the NFC-enabled parking meter from a wallet application on the NFC-enabled device.

14. The method of claim 13, further comprising, upon reserving the parking space, initiating a start of a timer associated with the NFC-enabled parking meter via a single NFC tap of the NFC-enabled device.

15. The method of claim 14, further comprising prepaying for an allotment of time for the parking space via the single NFC tap of the NFC-enabled device.

16. The method of claim 15, further comprising providing an alert to the NFC-enabled device to provide notification of a pending lapse of the allotment of time for the parking space.

17. The method of claim 16, further comprising providing an interface on the NFC-enabled device to pay an additional prepayment for an extended allotment of time for the parking space.

18. The method of claim 13, further comprising stopping the timer and paying for use of the parking space upon interfacing with the NFC-enabled parking meter via a second NFC tap of the NFC-enabled device.

19. The method of claim 18, further comprising releasing the parking space via the second NFC tap of the NFC-enabled device.

20. The method of claim 18, further comprising receiving an electronic confirmation for the payment for use of the parking space at the NFC-enabled device.

21. The method of claim 18, wherein the paying for the parking space comprises electronically paying with a payment card from a wallet application on the NFC-enabled device.

22. The method of claim 18, wherein receiving an electronic confirmation for the payment comprises receiving a short messaging service (SMS) message.

23. The method of claim 18, wherein receiving an electronic confirmation for the payment comprises receiving a multimedia messaging service (MMS) message.

24. The method of claim 13, further comprising, at the NFC-enabled parking meter, communicating with the backend server to provide an identification number to track the identity of a user associated with the NFC-enabled device.

25. The method of claim 24, wherein the NFC-enabled device is a mobile device and the identification number is a phone number associated with the mobile device.

26. The method of claim 13, further comprising monitoring a status of the parking space with an information collection device.

27. The method of claim 26, further comprising communicating the status of the parking space from the information collection device to a backend server.

28. The method of claim 13, further comprising displaying on a display disposed on the NFC-enabled parking meter whether the parking space is under a reservation or has been released.

29. The method of claim 13 comprising utilizing a handheld information collection device to check a status of the parking space.

30. A non-transitory computer readable medium having stored thereon comprising computer executable instructions that when executed by a processor of a computer control the computer to perform steps comprising:
   interfacing, via near field communications (NFC), an NFC-enabled device with an NFC-enabled parking meter associated with one or more parking spaces to receive data from the NFC-enabled parking meter regarding a parking space;
   reserving the parking space associated with the NFC-enabled parking meter through the NFC-enabled device, wherein the NFC-enabled parking meter includes a controller configured to measure time and process payment associated with a reservation of the parking space, wherein the controller is disposed in the NFC-enabled parking meter, wherein the controller does not communicate payment related data to a backend server that is located external to the NFC-enabled parking meter, and wherein the controller provides location specific marketing associated with local establishments in a vicinity of the parking space for display on the NFC-enabled device upon the interfacing of the NFC-enabled device with the NFC-enabled parking meter to create the reservation of the parking space;
   receiving an electronic confirmation for the reservation of the parking space at the NFC-enabled device; and
   interfacing, via NFC, the NFC-enabled device with the NFC-enabled parking meter to provide payment for use of the parking to the NFC-enabled parking meter from a wallet application on the NFC-enabled device.

31. A parking meter apparatus for facilitating reservation for a parking space with a near field communications (NFC)-enabled device, the parking meter comprising:
   a parking meter housing positionable proximate to a parking space;
   a wireless device transceiver disposed in the parking meter housing, the wireless device transceiver being configured to receive and transmit signals from and to an NFC-enabled device regarding a parking space to permit reservation of the parking space associated with the NFC-enabled parking meter through the NFC-enabled device, wherein the wireless device transceiver upon being interfaced with the NFC-enabled device via NFC receives payment for use of the parking space from a wallet application on the NFC-enabled mobile device; and a controller in communication with the wireless device transceiver and disposed in the parking meter housing, the controller configured for measuring time and processing payment associated with a reservation of the parking space, wherein the controller does not communicate payment related data to a backend server that is located external to the NFC-enabled parking meter, and wherein the controller provides location specific marketing associated with local establishments in a vicinity of the parking space for display on the NFC-enabled device upon the interfacing of the NFC-enabled device with the NFC-enabled parking meter to create the reservation of the parking space.

32. The parking meter apparatus of claim 31, further comprising a display disposed on the parking meter housing and in communication with the wireless device transceiver, the display capable of displaying information regarding a status of the parking space.

33. The parking meter apparatus of claim 31, wherein the wireless transceiver comprises a wireless device reader.

34. The parking meter apparatus of claim 31, wherein the wireless transceiver comprises an NFC passive tag.

* * * * *